United States Patent
D'Arcy et al.

(10) Patent No.: US 9,826,095 B2
(45) Date of Patent: Nov. 21, 2017

(54) SYSTEMS AND METHODS FOR MULTICHANNEL ROUTING OF WORK ITEMS IN A CONTACT CENTER

(71) Applicant: Avaya Inc., Basking Ridge, NJ (US)

(72) Inventors: Paul D'Arcy, Caherconlish (IE); Paul Denby, County Galway (IE); Tony McCormack, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 203 days.

(21) Appl. No.: 14/160,781

(22) Filed: Jan. 22, 2014

(65) Prior Publication Data

US 2015/0207937 A1 Jul. 23, 2015

(51) Int. Cl.
*H04M 3/523* (2006.01)
*H04M 3/51* (2006.01)

(52) U.S. Cl.
CPC ....... *H04M 3/5233* (2013.01); *H04M 3/5141* (2013.01)

(58) Field of Classification Search
CPC ...... H04M 3/5183; H04M 3/51; H04M 3/523; H04M 3/5233; H04M 3/5232; H04M 3/5133; H04M 2203/402
USPC ....................................... 379/265.05, 265.09
See application file for complete search history.

(56) References Cited

U.S. PATENT DOCUMENTS

| | | | |
|---|---|---|---|
| 6,771,765 B1* | 8/2004 | Crowther | H04M 3/523 379/265.09 |
| 7,092,509 B1* | 8/2006 | Mears | H04M 3/5233 379/265.02 |
| 2004/0081183 A1* | 4/2004 | Monza | H04L 41/06 370/412 |
| 2007/0041562 A1* | 2/2007 | Bernier | H04M 3/58 379/265.01 |
| 2007/0055777 A1* | 3/2007 | Lawrence | H04M 3/5232 709/226 |
| 2009/0261157 A1* | 10/2009 | Kumar | G06Q 30/02 235/375 |

* cited by examiner

Primary Examiner — Ahmad F Matar
Assistant Examiner — Jirapon Intavong

(57) ABSTRACT

A multichannel routing system for multichannel routing administration is disclosed. The multichannel routing system includes a data mining module configured to gather a plurality of profiles of agents and a plurality of parameters associated with one or more incoming work items. The multichannel routing system further includes a monitor module configured to monitor current status of the agents and priority of the incoming work items. The multichannel routing system further includes an analysis module configured to generate a multiplicity configuration of the agents based on the monitored current status of the agents and the priority of the incoming work items. The multichannel routing system further includes an assignment module configured to assign a plurality of media channels to the agents based on the generated multiplicity configuration, wherein the assignment of the media channels enables the multichannel routing administration.

20 Claims, 6 Drawing Sheets

SYSTEMS AND METHODS FOR MULTICHANNEL ROUTING OF WORK ITEMS IN A CONTACT CENTER

BACKGROUND

Field of the Invention

Embodiments of the present invention generally relate to a system and method for multichannel routing of work items and particularly to a system and method for multichannel routing administration in a contact center.

Description of Related Art

Contact centers are employed by many enterprises to service inbound and outbound contacts from customers. A typical contact center includes a switch and/or server to receive and route incoming packet-switched and/or circuit-switched contacts and one or more resources, such as human agents and automated resources (e.g., Interactive Voice Response (IVR) units), to service the incoming contacts or work items. Contact centers distribute contacts, whether inbound or outbound, for servicing to any suitable resource according to predefined criteria. In many existing systems, the criteria for servicing the contact from the moment that the contact center becomes aware of the contact until the contact is connected to an agent are client or operator-specifiable (i.e., programmable by the operator of the contact center), via a capability called vectoring. Normally in present-day Automatic Call Distributions (ACDs) when the ACD system's controller detects that an agent has become available to handle a contact, the controller identifies all predefined contact-handling queues for the agent (usually in some order of priority) and delivers to the agent the highest-priority, oldest contact that matches the agent's highest-priority queue. Generally, the only condition that results in a contact not being delivered to an available agent is that there are no contacts waiting to be handled.

The primary objective of contact center management is to ultimately maximize contact center performance and profitability. An ongoing challenge in contact center administration is monitoring and optimizing contact center efficiency. The contact center efficiency is generally measured in two ways that are service level and match rate.

Service level is one measurement of the contact center efficiency. Service level is typically determined by dividing the number of contacts accepted within the specified period by the number accepted plus the number that were not accepted, but completed in some other way (e.g., abandoned, given busy, canceled, flowed out etc.). Of course, service level definitions may vary from one enterprise to another.

Match rate is another indicator used in measuring the contact center efficiency. Match rate is usually determined by dividing the number of contacts accepted by a primary skill level agent within a period of time by the number of contacts accepted by any agent for a queue over the same period. An agent with a primary skill level is one that typically can handle contacts of a certain nature most effectively and/or efficiently. There are other contact center agents that may not be as proficient as the primary skill level agent, and those agents are identified either as secondary skill level agents or backup skill level agents. As can be appreciated, contacts received by a primary skill level agent are typically handled more quickly and accurately or effectively (e.g., higher revenue attained) than a contact received by a secondary or even backup skill level agent. Thus, it is an objective of most contact centers to optimize match rate along with service level.

In addition to service level and match rate performance measures, contact centers use other Key Performance Indicators (KPI), such as revenue, estimated, actual, or predicted wait time, average speed of answer, throughput, agent utilization, agent performance, agent responsiveness and the like, to calculate performance relative to their Service Level Agreements (SLAs). Operational efficiency is achieved when KPI are managed near, but not above, SLA levels.

Throughput is a measure of the number of calls/contact requests or work requests that can be processed in a given amount of time. Agent utilization is a measure of how efficiently agents' time is being used. Customer service level is a measure of the time customers spend waiting for their work to be handled. Company contact center customers wish to provide service to as many requests as possible in a given amount of time, using the least number of agents to do so, and minimizing the wait time for their customers that can increase the service level agreement of the contact center.

Typically, in order to maintain the contact center efficiency, agents of the contact center can take or handle a particular type of work items. The type of the work items includes voice conversations, video calls, emails, web chats, and instant messaging. For example, a group of agents of the contact center are allowed to handle incoming web chats, another group of agents are dedicated to attend only voice conversations, a third group of agents can only handle video calls, and so on. Each agent of the contact center may have an associate account to handle the incoming work items such as, an email account, a web chat session account, a dedicated telephone channel, or a dedicated video channel for providing services to the customers. Sometimes, these routing techniques can affect the efficiency of the contact center. For example, if the number of incoming work request of voice calls in the contact center is ten, and number of work items for web chats is three, then the agents handling the voice calls are overloaded with the incoming work items while the agents handling the web chats are in an idle state. Therefore, the conventional routing techniques are inflexible and do not take into account the type of work items, priority of the work items or customers associated with the work items when routing the incoming work items to the agents of the contact center.

There is thus a need for a system and method to generate multiplicity configuration of the agents and then assign multichannel work items to the agents of the contact center.

SUMMARY

Embodiments in accordance with the present invention provide a multichannel routing system for multichannel routing administration. The multichannel routing system includes a data mining module configured to gather a plurality of profiles of agents and a plurality of parameters associated with one or more incoming work items. The multichannel routing system further includes a monitor module configured to monitor current status of the agents and priority of the incoming work items. The multichannel routing system further includes an analysis module configured to generate the multiplicity configuration of the agents based on the monitored current status of the agents and the priority of the incoming work items. The multichannel routing system further includes an assignment module configured to assign a plurality of media channels to the agents based on the generated multiplicity configuration, wherein the assignment of the media channels enables the multichannel routing administration.

Embodiments in accordance with the present invention further provide a computer-implemented method for multichannel routing administration. The computer-implemented method includes collecting a plurality of profiles of agents and a plurality of parameters associated with one or more incoming work items, monitoring current status of the agents and priority of the incoming work items, analyzing the collected profiles of the agents and monitored current status of the agents and the priority of the incoming work items, generating the multiplicity configuration of the agents based on the analyzed data, and assigning a plurality of media channels to the agents based on the generated multiplicity configuration, wherein the assignment of the media channels enables the multichannel routing administration.

Embodiments in accordance with the present invention further provide a computer-implemented method for multichannel routing administration. The computer-implemented method includes collecting a profile of an agent and parameters of an incoming work item, monitoring current status of the agent and priority of the work item, analyzing the collected profile of the agent and monitored current status of the agents and the priority of the incoming work item, generating the multiplicity configuration of the agents based on the analyzed data, matching the parameters of the work item with the generated multiplicity configuration of the agent, and assigning a plurality of media channels to the agents based on the generated multiplicity configuration, wherein the assignment of the media channels enables the multichannel routing administration.

The present invention can provide a number of advantages depending on its particular configuration. First, the present invention provides a system and a method for dynamically generating multiplicity of agents of the contact center. In the present invention, the multiplicity of the agents is inferred based on the information gleaned from customer's interaction. The information that may be used to infer the multiplicity configuration of the agents may include type of the work items (e.g., voice call, video call, email, web chat etc.), priority of the customers (e.g., high priority customer, or low priority customer), context of the work items (e.g., sales call, support call, general inquiry etc.). Further, in an embodiment of the present invention, the type of the work items are given priority, such as, video calls are ranked as "rank 1", voice calls are ranked as "rank 2", emails are ranked as "rank 3", instant messaging are ranked as "rank 4", and so on. Based on these ranks, the multiplicity configuration of the agents of the contact center is inferred.

Next, the present invention allows an agent of the contact center to handle different media channels (e.g., voice call and web chats) simultaneously. For example, the present invention allows an agent of the contact center to initiate a web chat with the same customer who is currently communicating with the agent on a video call.

Further, the present invention allows an agent of the contact center to downcast an existing web chat to an automated chat machine or to transfer the web chat to another agent. For example, if an agent is currently handling a web chat and a video call of a high priority customer arrives in the contact center, then the agent may downcast the web chat to an automated chat machine and handle the video call. In another embodiment of the present invention, the agent may simultaneously handle both the work items such as, incoming video call and the existing web chat.

These and other advantages will be apparent from the disclosure of the present invention(s) contained herein.

The preceding is a simplified summary of the present invention to provide an understanding of some aspects of the present invention. This summary is neither an extensive nor exhaustive overview of the present invention and its various embodiments. It is intended neither to identify key or critical elements of the present invention nor to delineate the scope of the present invention but to present selected concepts of the present invention in a simplified form as an introduction to the more detailed description presented below. As will be appreciated, other embodiments of the present invention are possible utilizing, alone or in combination, one or more of the features set forth above or described in detail below.

BRIEF DESCRIPTION OF THE DRAWINGS

The above and still further features and advantages of the present invention will become apparent upon consideration of the following detailed description of embodiments thereof, especially when taken in conjunction with the accompanying drawings, and wherein.

Figure 1:
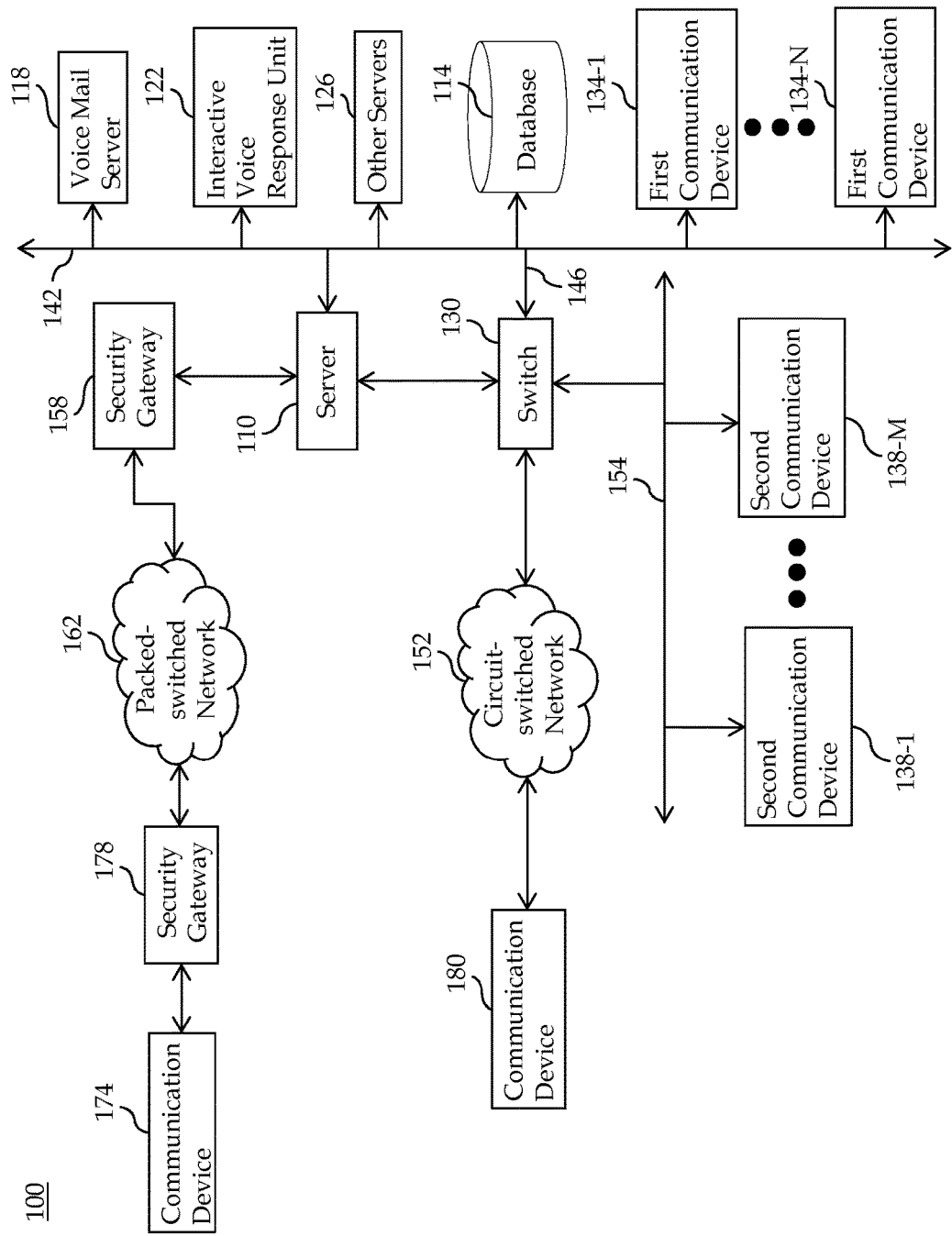
FIG. 1 illustrates a block diagram depicting a contact center according to an embodiment of the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

DETAILED DESCRIPTION

The present invention will be illustrated below in conjunction with an exemplary communication system, e.g., the Avaya Aura® system. Although well suited for use with, e.g., a system having an Automatic Call Distribution (ACD) or other similar contact processing switch, the present invention is not limited to any particular type of communication system switch or configuration of system elements. Those skilled in the art will recognize the disclosed techniques may be used in any communication application in which it is desirable to provide improved contact processing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), one or more and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read.

A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the present invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present invention is described in terms of exemplary embodiments, it should be appreciated those individual aspects of the present invention can be separately claimed.

The term "switch" or "server" as used herein should be understood to include a Private Branch Exchange (PBX), an ACD, an enterprise switch, or other type of communications system switch or server, as well as other types of processor-based communication control devices such as media servers, computers, adjuncts, etc.

FIG. 1 shows an illustrative embodiment of the present invention. A contact center 100 comprises a server 110, a set of data stores or database 114 containing contact or customer related information and other information that may enhance the value and efficiency of the contact processing, and a plurality of servers, namely a voice mail server 118, an Interactive Voice Response unit (e.g., IVR) 122, and other servers 126, a switch 130, a plurality of working agents operating packet-switched (first) communication devices 134-1-N (such as computer work stations or personal computers), and/or circuit-switched (second) communication devices 138-1-M, all interconnected by a Local Area Network (LAN) 142, (or Wide Area Network (WAN)). The servers may be connected via optional communication lines 146 to the switch 130. As will be appreciated, the other servers 126 may also include a scanner (which is normally not connected to the switch 130 or a Web Server), VoIP software, video call software, voice messaging software, an IP voice server, a fax server, a web server, an email server, and the like. The switch 130 is connected via a plurality of trunks to a circuit-switched network 152 (e.g., Public Switch Telephone Network (PSTN)) and via link(s) 154 to the second communication devices 138-1-M. A security gateway 158 is positioned between the server 110 and a packet-switched network 162 to process communications passing between the server 110 and the packet-switched network 162. The security gateway 158 may be implemented as hardware such as via an adjunct processor (as shown) or as a chip in the server.

Although the preferred embodiment is discussed with reference to client-server architecture, it is to be understood that the principles of the present invention apply to other network architectures. For example, the invention applies to peer-to-peer networks, such as those envisioned by the Session Initiation Protocol (SIP). In the client-server model or paradigm, network services and the programs used by end users to access the services are described. The client side provides a user with an interface for requesting services from the network, and the server side is responsible for accepting user requests for services and providing the services transparent to the user. By contrast in the peer-to-peer model or paradigm, each networked host runs both the client and server parts of an application program. Additionally, the invention does not require the presence of packet- or circuit-switched networks.

Figure 2:
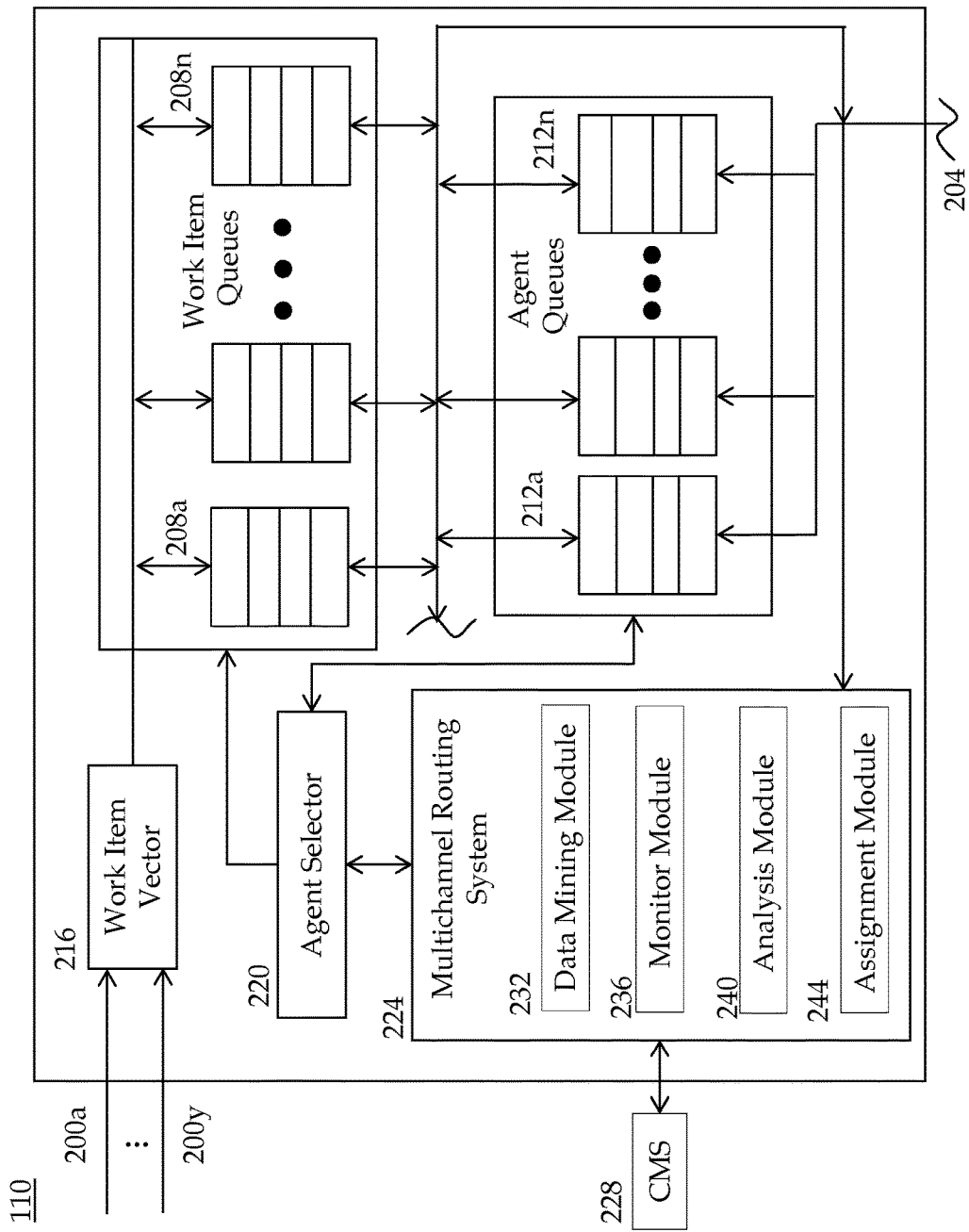
FIG. 2 illustrates a block diagram of a server according to an embodiment of the present invention.

Referring to FIG. 2, one possible configuration of the server 110 is depicted. The server 110 is in communication with a plurality of customer communication lines 200a-y (which can be one or more trunks, phone lines, etc.) and agent communication line 204 (which can be a voice-and-data transmission line such as the LAN 142 and/or a circuit switched voice line). The server 110 can include Avaya Inc.'s an Operational Analyst™ (OA) with On-Line Analytical Processing (OLAP) technology, or a Call Management System (CMS) 228 that gathers profile of agents of the contact center and monitors current status of the agents and parameters of the incoming work items. OA and CMS will hereinafter be referred to jointly as CMS 228.

The switch 130 and/or server 110 may be any architecture for directing contacts to one or more communication devices. In some embodiments, the switch 130 may perform load-balancing functions by allocating incoming or outgoing contacts among a plurality of logically and/or geographically distinct contact centers. Illustratively, the switch 130 and/or server 110 may be a modified form of the subscriber-premises equipment sold by Avaya Inc. under the names Definity™ Private-Branch Exchange (PBX)-based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch 130/server 110 is a stored-program-controlled system that conventionally includes interfaces to external communication links, a communications switching fabric, service circuits (e.g., tone generators, announcement circuits, etc.), memory for storing control programs and data, and a processor (i.e., a computer) for executing the stored control programs to control the interfaces and the fabric and to provide ACD functionality. Other types of known switches and servers are well known in the art and therefore not described in detail herein.

As can be seen in FIG. 2, included among the data stored in the server 110 is a set of contact queues or work item queues 208a-n and a separate set of agent queues 212a-n. Each work item queue 208a-n corresponds to a different set of agent queues, as does each agent queue 212a-n. Conventionally, contacts are prioritized and either is enqueued in individual ones of the contact queues 208a-n in their order of priority or is enqueued in different ones of a plurality of contact queues 208a-n that correspond to a different priority. Likewise, each agent's queue 212a-n are prioritized according to his or her level of expertise or skill in that queue, and either agents are enqueued in individual ones of agent queues 212a-n in their order of expertise level or are enqueued in different ones of a plurality of agent queues 212a-n that correspond to a queue and each one of which corresponds to a different expertise level.

Included among the control programs in the server 110 is a work item vector 216. Contacts incoming to the contact center are assigned by the work item vector 216 to different work item queues 208a-n based upon a number of predetermined criteria, including customer identity, customer needs, contact center needs, current contact center queue lengths, customer value, and the agent skill that is required for the proper handling of the contact. Agents who are available for handling work items are assigned to the agent queues 212a-n based upon the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skill levels and secondary skill levels in another configuration), and hence may be assigned to different agent queues 212a-n at different expertise levels.

In one configuration, the contact center is operated by a contract operator (e.g., a supervisor or a manager of the contact center), and each of the work item queues 208a-n, and possibly each of the agent queues 212a-n, corresponds to a different client. Each client can have a separate service level agreement or other type of performance measurement agreement with the contract operator regarding performance expectations, goals, requirements or specifications for the client's respective queue(s). The service level agreement can set forth penalties, such as financial penalties, for failing to comply with the service level agreement's requirements.

Referring again to FIG. 1, the first communication devices 134-1-N are packet-switched and may include, for example, IP hardphones such as the Avaya Inc.'s, 4600 Series IP Phones™, IP softphones such as Avaya Inc.'s, IP Softphone™, Personal Digital Assistants (PDAs), Personal Computers (PCs), laptops, packet-based H.320 video phones and conferencing units, packet-based voice messaging and response units, packet-based traditional computer telephony adjuncts, peer-to-peer based communication devices, and any other communication device.

The second communication devices 138-1-M are circuit-switched. Each of the communication devices 138-1-M corresponds to one of a set of internal extensions Ext1-M, respectively. The second communication devices 138-1-M may include, for example, wired and wireless telephones, PDAs, H.320 videophones and conferencing units, voice messaging and response units, traditional computer telephony adjuncts, and any other communication device.

It should be noted that the invention does not require any particular type of information transport medium between switch, or server and first and second communication devices, i.e., the invention may be implemented with any desired type of transport medium as well as combinations of different types of transport channels.

The packet-switched network 162 can be any data and/or distributed processing network, such as the Internet. The packet-switched network 162 typically includes proxies (not shown), registrars (not shown), and routers (not shown) for managing packet flows.

The packet-switched network 162 as shown in FIG. 1 is in communication with a first communication device 174 via a security gateway 178, and the circuit-switched network 152 with an external second communication device 180.

In a preferred configuration, the server 110, packet-switched network 162, and the first communication devices 134-1-N are Session Initiation Protocol (SIP) compatible and can include interfaces for various other protocols such as the Lightweight Directory Access Protocol (LDAP), H.248, H.323, Simple Mail Transfer Protocol (SMTP), IMAP4, ISDN, E1/T1, and analog line or trunk.

It should be emphasized that the configuration of the switch 130, the server 110, user communication devices, and other elements as shown in FIG. 1 is for purposes of illustration only and should not be construed as limiting the invention to any particular arrangement of elements.

As will be appreciated, the server 110 is notified via the LAN 142 of an incoming work item by communications component (e.g., switch 130, fax server, email server, Web Server, and/or other servers) receiving the incoming work items as shown in FIG. 1. The incoming work item is held by the receiving telecommunications component until the server 110 forwards instructions to the component to forward or route the work item to a specific contact center resource, such as the IVR unit 122, the voice mail server 118, and/or first or second communication device 134-1-N, 138-1-M associated with a selected agent. The server 110 distributes and connects these work items to telecommunication devices of available agents based on the predetermined criteria noted above. When the server 110 forwards a voice contact (or first work item) to an agent, the server 110 also forwards customer-related information from the database 114 to the agent's computer work station for viewing (such as by a pop-up display) to permit the agent to better serve the customer of the contact center. Depending on the agent's profiles, their current working status, and parameters of the incoming work items, the server 110 may assign a multichannel work item to the agents of the contact center. The agents process the incoming work items or contacts sent to them by the server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

According to the present invention, included among the programs executing on the server 110 are an agent selector 220 and a multichannel routing system 224. The agent selector 220 and the multichannel routing system 224 are stored either in the main memory or in a peripheral memory (e.g., disk, CD ROM, etc.) or some other computer-readable medium of the contact center. The agent selector 220 effects an assignment between available work items (or contacts) and available agents in a way that tends to maximize contact center efficiency for the current contact center state. The agent selector 220 uses predefined criteria in selecting an appropriate agent to service the work item. The multichannel routing system 224, in particular, obtains, for each of a plurality of contact center business goals or objectives, current status information of agents, or information respecting whether or not a corresponding metrics (for example, the service level agreement) is being met or unmet and/or a level to which the corresponding goal is being met or unmet. For example, exemplary metrics can be expressed as actual, average or median wait times in each work item queues 208a-n, actual, average, or median agent staffing levels in each agent queue 212a-n, actual, average, or median revenue (whether gross or net) realized by a designated set of agents (such as the agents in an agent skill queue) per serviced contact, a customer satisfaction level for a set of designated agents determined during or after servicing of each customer's contact, actual, average, or median time for the agents in a set of designated agents to service contacts, number of contacts to be serviced by a set of designated agents during a selected time period, and the service level agreement between the contractor and the client. This information, along with other statistics is typically gathered by the CMS 228.

According to an embodiment of the present invention, the multichannel routing system 224 includes a data mining module 232, a monitor module 236, an analysis module 240, and an assignment module 244.

The data mining module 232 is configured to collect profile and data of resources or agents of the contact center in an embodiment of the present invention, wherein the agent data for providing customer services is obtained by the contact center in several ways and from several sources. A primary source for collecting the agent data may be the contact center itself. However, information included in the agent data may provide a limited view of the overall characteristics of the agent, specifically the characteristics of the agent with respect to the contact center. The agent profile may include agent's self-description, skill sets, likes, locations etc. The agent's skill sets include agent's interests, education and work histories, hobbies, hometowns, favourite sport teams and TV shows, cultural background, and so on. In an embodiment of the present invention, the agent profile is stored and maintained in the database 114 of the contact center.

As user herein, the term "agent skill set" refers to the set of agent data that is used by the contact center to characterize an agent. Such agent data may include biographical agent data, demographic agent data, and external or internal behavioural agent data, to name a few. The behavioural data may include the agent's history with respect to the contact center and/or any other entity or social media channel. However, the agent data is not limited in this regard and may include any other type of agent data used by the contact center to characterize or classify agents. Further, the agent data may include any other agent data collected from one or more sources external to the contact center. Additionally, the agent profile may be raw data or processed agent data. That is, the agent data may be analyzed to characterize the agent and thereafter used to provide customized or personalized services to the customer. For example, an agent profile may be a set of values associated with an agent and a set of characteristics, where the values are selected based on the agent data obtained. However, the disclosure is not limited in this regard and any other methods for evaluating agent data to provide services that may be used without limitation.

Accordingly, in another embodiments of the present invention, a secondary source of agent data is utilized, i.e., social media channels. In particular, the contact center is configured to access and monitor social media channels (not shown in figure) for the agent data. Such social media channels may include direct social media channel or indirect social media channel, and social media channels associated with a same or a different domain as compared to the domain of the contact center. As a result, the agent data collected may add additional aspects of the agent's interest. Thus, the agent data may more accurately reflect the overall characteristics of the agent and allows the contact center to provide more customized customer services to the customers. In an embodiment of the present invention, the agent's profile may be generated by mining agent's data from social media networks. For example, the agent's social media posting history may reveal a lot about the agent's skills related to the business (e.g., interested and proficient in solving mobile device problems), eloquence, communication style (e.g., "youthful", "mature", "techy", "trendy", "conservative", "in-depth"), enthusiasm, and other personality traits that may have a bearing on customer service. The profile of the agent of the contact center is updated automatically at configurable intervals.

The data mining module 232 is further configured to collect parameters or details from the incoming work items such as type of incoming work item i.e., whether the call made by a customer is a video call, a voice conversation, textual conversation, emails, or an instant messaging. Further, the data mining module 232 is configured to extract context of the incoming work item based on the inputs selected by the customer in an IVR menu, in an embodiment of the present invention. For example, inputs (e.g., selected button "5" for a "health insurance policy", and "2" for "inquiry") selected by the customer in the IVR menu may generate that the customer desires to inquire about a health insurance policy.

The monitor module 236 is configured to monitor priority of the work items in an embodiment of the present invention. For example, a video call may be given a highest priority or "rank 1", voice conversations may have "rank 2", instant messaging may be given "rank 3", emails may be given "rank 4", and so on. In another embodiment of the present invention, the monitor module 236 is configured to collect customer information from the database 114 of the contact center. The customer information may include customer's name, customer's credit history, customer's priority i.e., high priority customer, and low priority customer.

The monitor module 236 is further configured to monitor current status of the agents available in the contact center at the time of incoming work items in an embodiment of the present invention. The current status of the agents may include number of existing work items being handled by the agents, type of work items being handled, priority of the customers etc. The monitored current status of the agents may then be stored in the database 114 in the form of numerical or graphical representation such as a table, pie charts, bar graphs etc. For example, agent 1 is handling a voice call of a high priority customer, agent 2 is handling two instant messaging chats of low priority customer, agent 3 is handling a voice call of a low priority customer and simultaneously having a web chat session with another low priority customer, and so on. The database 114 of the contact center may be updated dynamically in an embodiment of the present invention.

The analysis module 240 is configured to analyze the data collected and monitored by the data mining module 232 and the monitor module 236 in an embodiment of the present invention. Based on the analysis of the data, the parameters of the incoming work items are matched with the profiles and current status of the agents available in the contact center. For example, if an incoming work item is related to a general health query and the type of the work item is a voice conversation, then an agent who is proficient in dealing with health queries and may handle the voice conversation is matched. In case, if the most proficient agent who has a profile matching with the parameters of the work item is busy on another voice call, then the work item is matched with the profiles of other agents having similar profile. The matching of the parameters of the work item and profiles of the agents are then stored in the form of a numerical or graphical representation in the database 114 of the contact center.

Further, the analysis module 240 is configured to generate multiplicity configuration of the agents based on the monitored and collected data in an embodiment of the present invention. The analysis module 240 is configured to dynamically generate multiplicity configuration of the agents of the contact center based on their current working status and parameters of the incoming work items. The multiplicity configuration of the agents may be generated as the ability of the agents to manage more than one work item at one point of time. For example, if multiplicity configuration of an agent is inferred as "two" then the agent may handle two customers or two work items such as a voice conversation of a high priority customer and an instant messaging of a low priority customer concurrently. So, the multiplicity configuration may allow an agent of the contact center to handle more than one type of work item at any point of time. A person having ordinary skill in the art may easily understand that it is hard to manage two voice conversations or video calls, or one voice and one video call simultaneously. Therefore, an agent of the contact center may handle two different types of the work items such as one voice conversation and an email session, or a video call and an instant messaging, or an email session and two web chats, and so on. In another embodiment of the present invention, the analysis module 240 is further configured to generate the multiplicity configuration based on transaction histories of previous engagements of the agents of the contact center.

In another embodiment of the present invention, the multiplicity configuration may allow an agent of the contact center to handle a voice conversation of a high priority customer and an instant messaging of a low priority customer simultaneously. In another embodiment of the present invention, if a high priority customer desires to initiate a web chat, whilst on a video call with an agent, then the analysis module 240 may permit the agent to start the web chat with the customer based on predefined rules. The predefined rules may include priority of the customer in an embodiment of the present invention. In another embodiment of the present invention, if the customer is a low priority customer, then the analysis module 240 may reject the customer's request for multichannel routing to the agent.

Further, if an agent is handling two web chats of low priority customers and a voice call of a high priority customer is arrived at the contact center, then the analysis module 240 may enable the agent to downcast the existing web chats to an automated web chat system or an agent. In another embodiment of the present invention, the agent may also transfer the existing web chats to another agent. In case, if the existing web chats are at a point in conversation where the automated chat agent cannot provide any additional value, or may not be able to manage the business goals (e.g., service level agreement) of the contact center, then the voice conversation may be routed to another agent.

In yet another embodiment of the present invention, if an agent of the contact center is on a voice call with a low priority customer and a web chat of a high priority customer is arrived in the contact center, then the analysis module 240 is configured to change the multiplicity configuration of the agent and the same agent is selected to handle the incoming web chat.

The assignment module 244 is configured to assign the incoming work items to the agents based on the multiplicity configuration generated for each agent in an embodiment of the present invention. Based on the multiplicity configuration of the agents, the incoming work items are routed to the matched agents. For example, let say, multiplicity configuration of an agent is generated as two and the agent is currently handling a web chat of a low priority customer. An incoming work item is a video call of a high priority customer, and then the incoming work item (i.e., video call) is assigned to that agent.

Figure 3A:
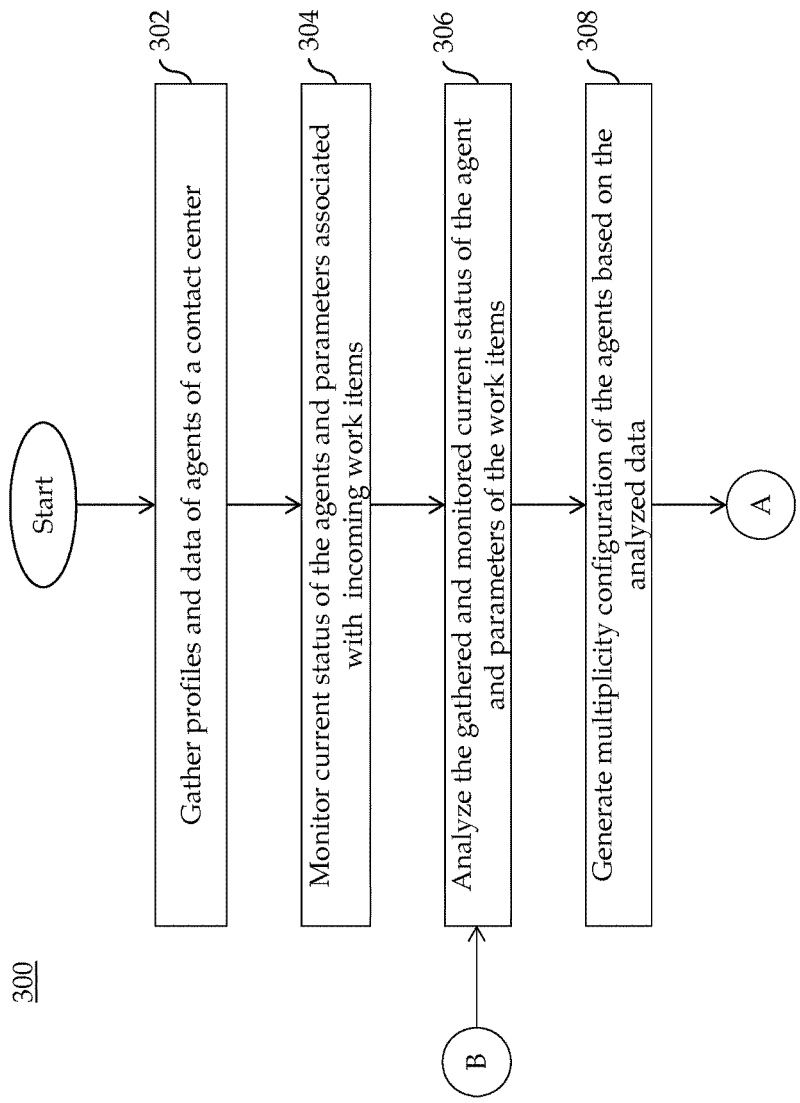
FIGS. 3A and 3B depict a flowchart of a method for multichannel routing administration in a contact center according to an embodiment of the present invention.
Figure 3B:
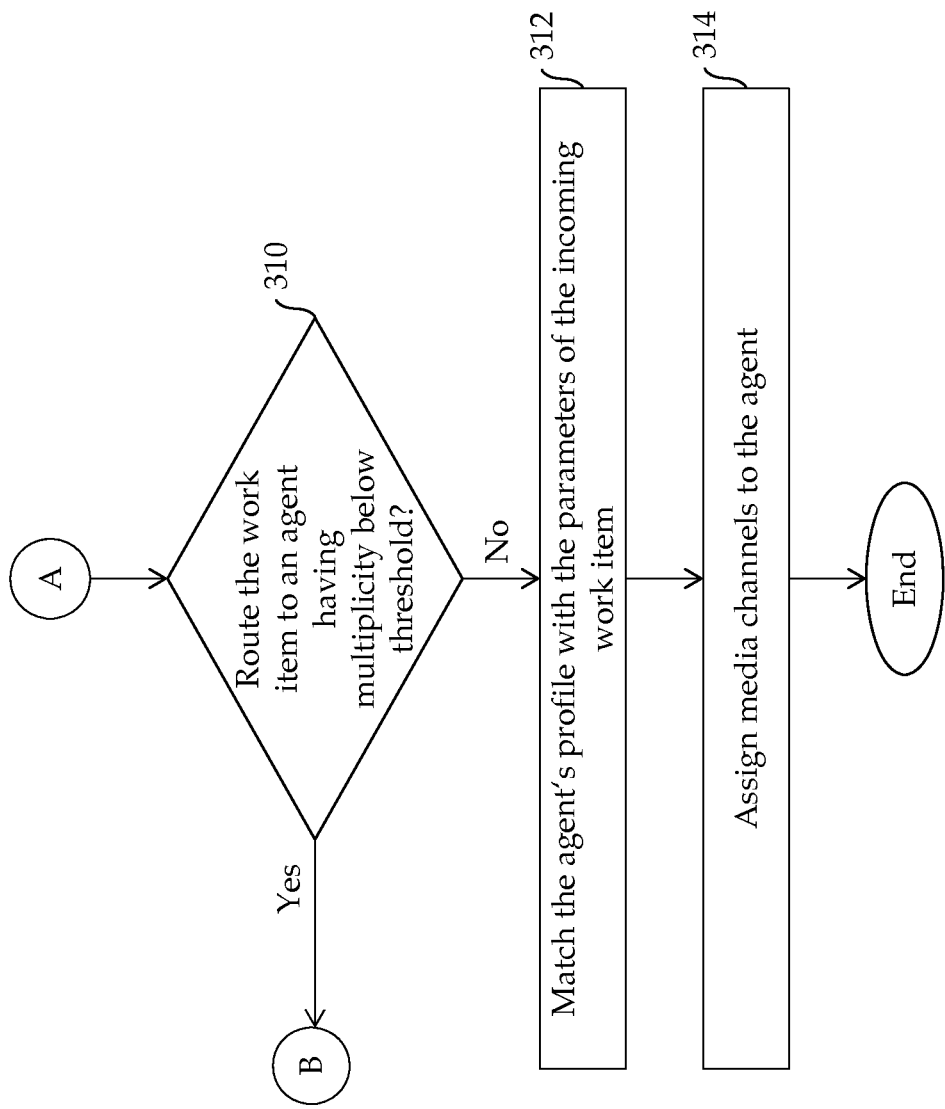

FIGS. 3A and 3B depict a flowchart of a method 300 for multichannel routing administration in a contact center according to an embodiment of the present invention.

At step 302, a multichannel routing system 224 may gather agent's profile and data from the database 114 of the contact center in an embodiment of the present invention. Further, the agent profile includes self-description, skill sets, likes, locations etc. The agent's skill sets may further include agent's interests, education and work histories, hobbies, hometowns, favourite sport teams and TV shows, cultural background, and so on.

Accordingly, in another embodiment of the present invention, a secondary source of agent data is utilized, i.e., social media channels (not shown in figure). In another embodiment of the present invention, the profile of the agent of the contact center is updated automatically at configurable intervals.

At step 304, the multichannel routing system 224 may monitor current status of the agents of the contact center in an embodiment of the present invention. The current status of the agents may include number of existing work items that are being handled by the agents, type of work items being handled, priority of the customers etc. For example, agent 1 is handling a video call of a high priority customer, agent 2 is handling two instant messaging of low priority customers, agent 3 is handling a voice call of a low priority customer and simultaneously having a web chat session with a low priority customer, and so on. The current status of the agents is then stored in the database 114 of the contact center and is updated dynamically at regular intervals.

Further, the multichannel routing system 224 may monitor parameters of incoming work items such as type of incoming work item i.e., whether the call made by a customer is a video call, a voice conversation, a textual conversation, an email, or an instant messaging. Also, the multichannel routing system 224 may extract context of the incoming work item, based on the inputs selected by the customer in an IVR menu, in an embodiment of the present invention.

Further, the multichannel routing system 224 may monitor priority of the work item in an embodiment of the present invention. The incoming work items of the contact center may have different priorities in an embodiment of the present invention. For example, voice conversations may have a highest priority or "rank 1", instant messaging may have "rank 2", emails may have "rank 3", and so on. In another embodiment of the present invention, the multichannel routing system 224 may also monitor customer information from the database 114 of the contact center. The customer information may include customer's name, customer's credit history, customer's priority i.e., high priority customer, and low priority customer.

At step 306, the multichannel routing system 224 may then analyze the collected agent profile and monitored data (i.e., current status of the agents and parameters of the incoming work items) in an embodiment of the present invention. Based on the analysis of the data, the incoming work item is matched with the profiles and current status of the agents available in the contact center. For example, if an incoming work item is related to a "general health query" and the type of the work item is a voice conversation, then an agent who is proficient in dealing with health queries and may handle the voice conversation is matched. In case, if the most proficient agent who has a profile matching with the parameters of the work item is busy on another voice call, then the work item is matched with profiles of other agents having similar profile. The matching of the parameters of the work item and profiles of the agents are then stored in the form of a numerical or graphical representation in the database 114 of the contact center.

At step 308, the multichannel routing system 224 may generate multiplicity configuration of the agents based on the data analyzed in the step 306 in an embodiment of the present invention. The multichannel routing system 224 may dynamically generate multiplicity of the agents of the contact center based on their current working status and parameters of the incoming work items. For example, if multiplicity configuration of an agent is two then the agent may handle two customers such as a voice conversation of a high priority customer and an instant messaging of a low priority customer concurrently. So, the multiplicity configuration may allow an agent of the contact center to handle more than one type of work item at a point of time.

At step 310, the multichannel routing system 224 determines whether the incoming work item is to be routed to an agent based on the generated multiplicity configuration of the agent. In case, if the generated multiplicity configuration of an agent is below a threshold (e.g., two), then the incoming work item may not be routed to the agent and the method 300 returns to the step 306. Otherwise, the method 300 proceeds towards step 312.

At step 312, the multichannel routing system 224 may match the agent's profile with the parameters of the incoming work item in an embodiment of the present invention. Based on the matching of the agent profile with the parameters of the incoming work item, the multichannel routing system 224 may select an agent to route the incoming work item. The matching of the agent's profile with the parameters of the incoming work request are stored in the database 114 of the contact center in the form of a table, pie charts, bar graphs etc.

At step 314, the multichannel routing system 224 may assign the incoming work request to the agent selected based on the matching in an embodiment of the present invention. Based on the matching and multiplicity configuration of the agents, the incoming work item is routed to the matched agent. For example, let say, multiplicity configuration of an agent is two and the agent is currently handling a web chat of a low priority customer. An incoming work item is a video call of a high priority customer then the incoming work item (i.e., video call) is assigned to that agent.

Figure 4A:
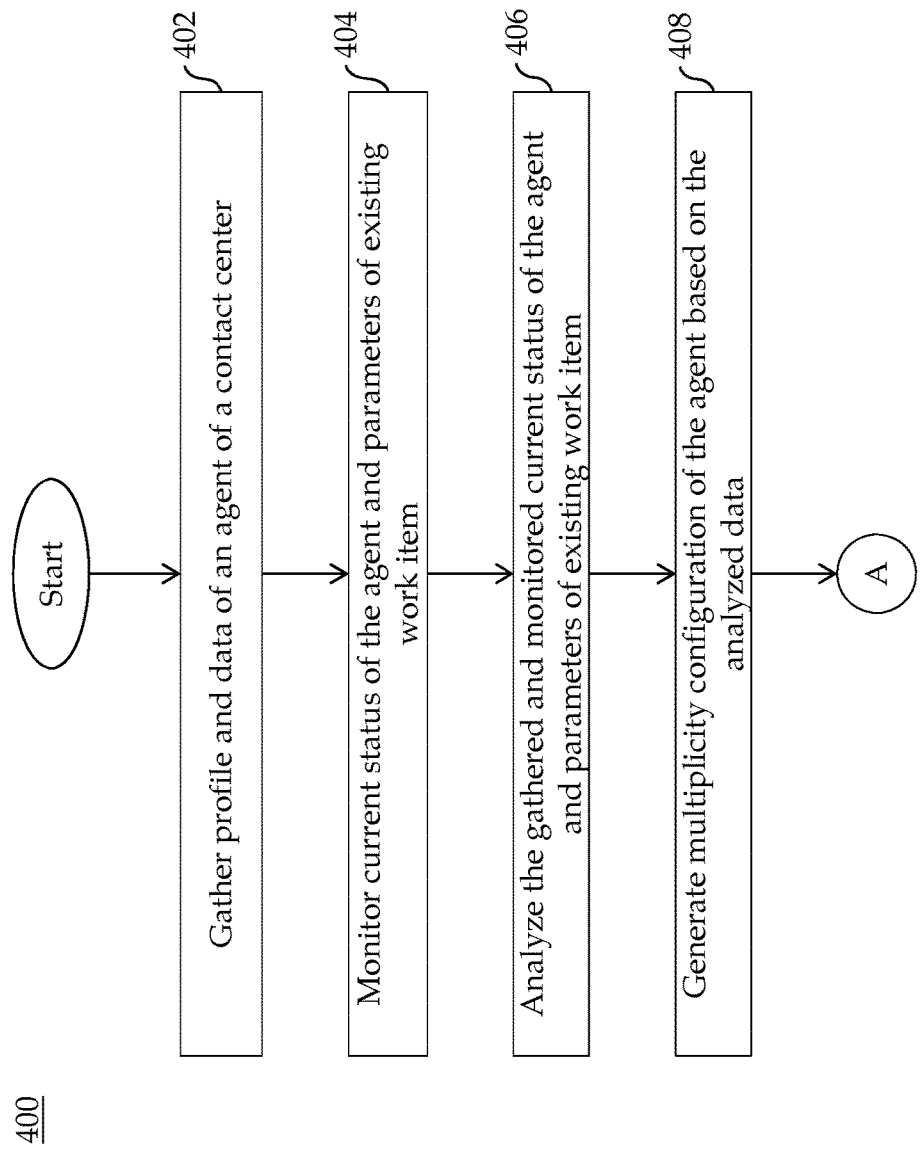
FIGS. 4A and 4B depict a flowchart of a method for multichannel routing administration in a contact center according to another embodiment of the present invention.
Figure 4B:
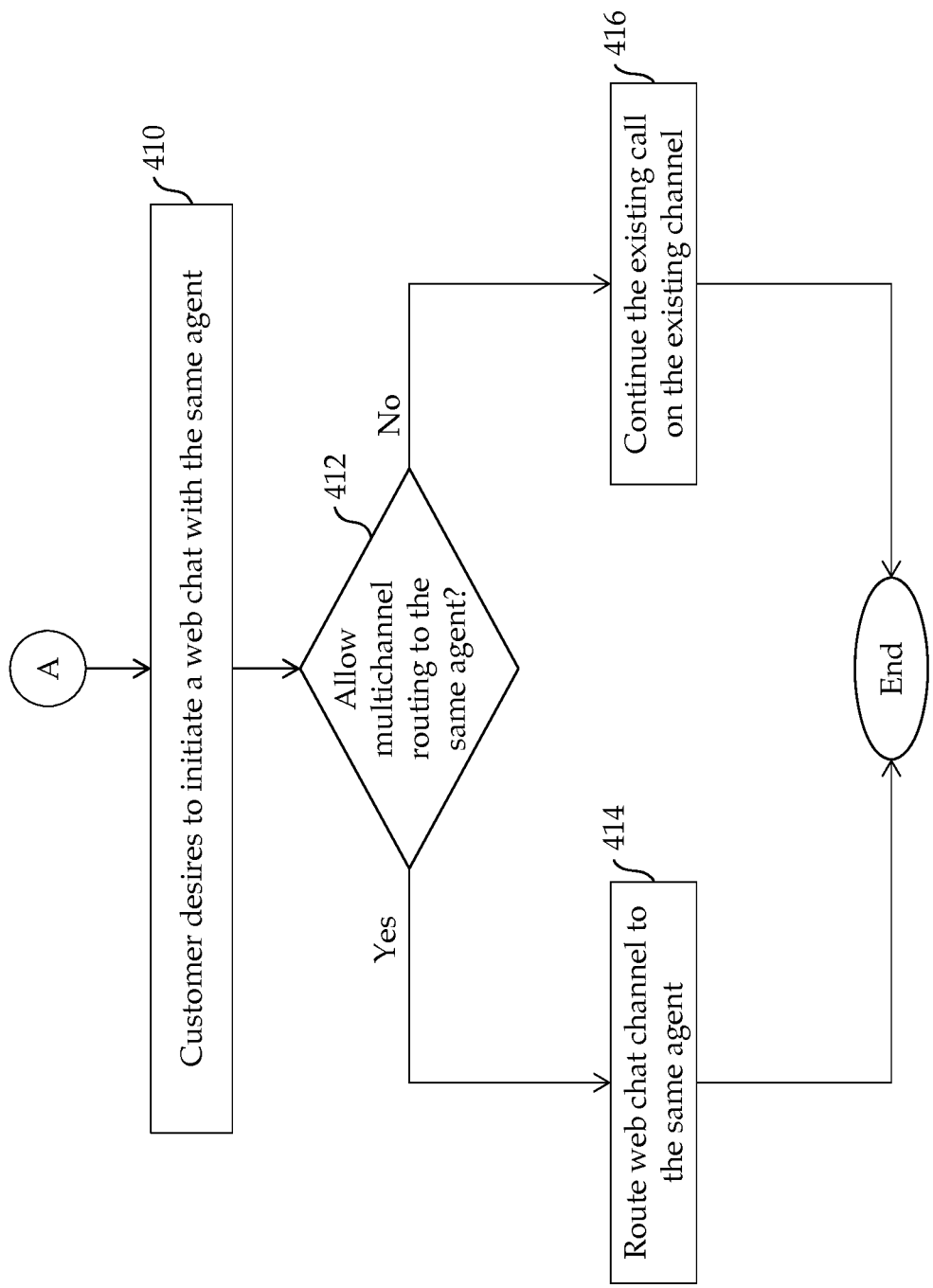

FIGS. 4A and 4B depict a flowchart of a method 400 for multichannel routing administration according to another embodiment of the present invention.

At step 402, a multichannel routing system 224 may gather profile and data of an agent who is currently handling a work item from the database 114 of the contact center in an embodiment of the present invention. Further, the agent profile includes agent's self-description, skill sets, likes, locations etc. The agent's skill sets include agent's interests, education and work histories, hobbies, hometowns, favourite sport teams and TV shows, cultural background, and so on. In another embodiment of the present invention, the multichannel routing system 224 may gather agents' data from social media channels that may reveal a lot about the agent's skills, and other personality traits. The profile of the agent of the contact center is updated automatically at configurable intervals.

At step 404, the multichannel routing system 224 may monitor current status of the agent of the contact center in an embodiment of the present invention. The current status of the agent may include number of existing work items that are being handled by the agent, type of work items that are being handled, priority of the customers etc. For example, let say the agent is currently handling a video call of a high priority customer. The current status of the agent is then stored in the database 114 of the contact center and is updated dynamically at regular intervals.

Further, the multichannel routing system 224 may monitor parameters of the existing work item such as type of incoming work item i.e., whether the call made by a customer is a video call, a voice conversation, a textual conversation, an email, or an instant messaging. In this case, the type of the existing work item is a video call. Also, the multichannel routing system 224 may extract context or purpose of the incoming work item for example, based on the customer's input (e.g., pressed button "3" for an insurance policy and pressed button "7" for "sales") selected in an IVR menu of the contact center, the multichannel routing system 224 may extract that the customer desires to have an insurance policy.

Further, the multichannel routing system 224 may monitor priority of the work item in an embodiment of the present invention. The incoming work items of the contact center may have different priorities in an embodiment of the present invention. In another embodiment of the present invention, the multichannel routing system 224 may also monitor the customer information from the database 114 of the contact center. The customer information may include customer's name, customer's credit history, customer's priority i.e., high priority customer, and low priority customer.

At step 406, the multichannel routing system 224 may analyze the gathered agent profile and data and monitored data (i.e., agent's current status and the parameters of the existing work item) in an embodiment of the present invention.

At step 408, the multichannel routing system 224 may then generate multiplicity configuration of the agent based on the analyzed data in an embodiment of the present invention. The multichannel routing system 224 may dynamically generate the multiplicity configuration of the agent of the contact center based on the current working status and the parameters of the work items. For example, when the agent is handling a video call of a high priority customer, therefore the multiplicity configuration for the agent is generated as one as the agent cannot handle another voice or video call.

At step 410, the multichannel routing system 224 may receive a request from a customer of the existing work item to initiate a web chat with the same agent. For example, the customer of the existing video call desires to get some information about a product (e.g., health insurance policy) then the customer may request to initiate a web chat with the same agent. In an embodiment of the present invention, the customer may request for the web chat by selecting options from the IVR menu.

At step 412, the multichannel routing system 224 determines whether to allow multichannel routing to the agent. The multichannel routing system 224 may determine the allowance of multichannel routing to the agent based on predefined rules in an embodiment of the present invention. The predefined rules may include priority of the customer, the type of the work item, context of the work item and so on. In case, if the customer of the existing video call is a high priority customer, then the multichannel routing system 224 may allow multichannel routing to the same agent and the method 400 proceeds towards step 414. In case, if the customer of the existing video call is a low priority customer, then the then the multichannel routing system 224 may reject the multichannel routing request to the same agent and the method 400 proceeds towards step 416.

At step 414, the multichannel routing system 224 may route the work item to the agent by providing a web chat channel to the same agent in an embodiment of the present invention. The same agent may then provide customer services to the customer on the web chat whilst communicating with the customer on the video call.

At step 416, the multichannel routing system 224 may continue the existing work item on the existing media channel of the contact center in an embodiment of the present invention. For example, if the multichannel routing system 224 rejects the request of the low priority customer to initiate a web chat with the same agent and then the agent continues to handle the existing video call on the media channel assigned to the agent.

The exemplary systems and methods of this present invention have been described in relation to a contact center. However, to avoid unnecessarily obscuring the present invention, the preceding description omits a number of known structures and devices. This omission is not to be construed as a limitation of the scope of the present invention. Specific details are set forth to provide an understanding of the present invention. It should however be appreciated that the present invention may be practiced in a variety of ways beyond the specific detail set forth herein.

Furthermore, while the exemplary embodiments of the present invention illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a switch, server, and/or adjunct, or collocated on a particular node of a distributed network, such as an analog and/or digital telecommunications network, a packet-switch network, or a circuit-switched network.

It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the present invention.

A number of variations and modifications of the present invention can be used. It would be possible to provide for some features of the present invention without providing others.

For example in one alternative embodiment of the present invention, the systems and methods of this present invention can be implemented in conjunction with a special purpose computer, a programmed microprocessor or microcontroller and peripheral integrated circuit element(s), an ASIC or other integrated circuit, a digital signal processor, a hardwired electronic or logic circuit such as discrete element circuit, a programmable logic device or gate array such as PLD, PLA, FPGA, PAL, special purpose computer, any comparable means, or the like.

In general, any device(s) or means capable of implementing the methodology illustrated herein can be used to implement the various aspects of this present invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, non-volatile storage, input devices, and output devices. Furthermore, alternative software implementations including, but not limited to, distributed processing or component/object distributed processing, parallel processing, or virtual machine processing can also be constructed to implement the methods described herein.

In yet another embodiment of the present invention, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this present invention is dependent on the speed and/or efficiency requirements of the system, the particular function, and the particular software or hardware systems or microprocessor or microcomputer systems being utilized.

In yet another embodiment of the present invention, the disclosed methods may be partially implemented in software that can be stored on a storage medium, executed on programmed general-purpose computer with the cooperation of a controller and memory, a special purpose computer, a microprocessor, or the like. In these instances, the systems and methods of this present invention can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present invention describes components and functions implemented in the embodiments with reference to particular standards and protocols, the present invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the present invention has been presented for purposes of illustration and description. The foregoing is not intended to limit the present invention to the form or forms disclosed herein. In the foregoing Detailed Description for example, various features of the present invention are grouped together in one or more embodiments, configurations, or aspects for the purpose of streamlining the disclosure. The features of the embodiments, configurations, or aspects of the present invention may be combined in alternate embodiments, configurations, or aspects other than those discussed above. This method of disclosure is not to be interpreted as reflecting an intention that the present invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present invention.

Moreover, though the description of the present invention has included description of one or more embodiments, configurations, or aspects and certain variations and modifications, other variations, combinations, and modifications are within the scope of the present invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A multichannel routing system for multichannel routing administration, the multichannel routing system comprising:

a server comprising a processor coupled to memory, wherein the processor executes program code stored in the memory to:

gather profiles of a plurality of agents and a plurality of parameters associated with one or more incoming work items;

monitor current status of the agents and priorities of the incoming work items, wherein: the priorities of the incoming work items are based on a type of work item and a customer associated with the incoming work item; and the priorities of the incoming work items are relative to each other;

generate, dynamically, multiplicity configurations for the agents based on the monitored current status of the agents and the priorities of the incoming work items, wherein the multiplicity configuration indicates how many work items may be handled by the agent associated with the multiplicity configuration; and assign a plurality of media channels to communication devices associated with the agents based on the generated multiplicity configurations, wherein the assignment of the media channels enables the multichannel routing administration.

2. The multichannel routing system of claim 1, wherein the profile of an agent comprises one or more of a self-description, skill sets, likes, locations, interests, education and work histories, hometowns, and cultural background.

3. The multichannel routing system of claim 1, wherein the parameters of the work items comprises one or more of a type of the incoming work items, and a context of the incoming work items.

4. The multichannel routing system of claim 3, wherein the type of the incoming work items comprises one or more of a video call, a voice conversation, an email, a web chat, and an instant messaging.

5. The multichannel routing system of claim 1, wherein a plurality of the work items have different work priorities.

6. The multichannel routing system of claim 1, wherein the current status of agents comprises number of existing work items being handled by the agents, type of work items handled by the agents, and priority of the customers.

7. The multichannel routing system of claim 6, wherein the processor further executes the program to dynamically generate the multiplicity configuration of the agents based on their current working status and parameters of the incoming work items.

8. The multichannel routing system of claim 1, wherein the processor further executes the program to enable the agents to downcast, based on a priority of the existing work item, wherein the priority of the existing work item is based on a type of work item and a customer associated with the existing work item, an existing work item to one or more of:

an automated chat agent, and a communication device associated with another agent.

9. The multichannel routing system of claim 1, wherein the processor further executes the program to enable the agents to handle the incoming work items on different media channels, wherein the media channels comprises one or more of a video channel, a telephone channel, an email account, a web chat session, and an instant messaging session.

10. The multichannel routing system of claim 1, wherein the processor further executes the program to enable the agents to determine whether the agent may simultaneously communicate with the customer on two different media channels based on the priority of the customer.

11. The multichannel routing system of claim 1, wherein the processor further executes the program to infer the multiplicity configuration based on simultaneous combination of the agent's skills, the type of the work items, and number of the work items for each type of the work item.

12. A computer-implemented method for multichannel routing administration, the method comprising:

collecting profiles of a plurality of agents and a plurality of parameters associated with one or more incoming work items;

monitoring current status of the agents and priorities of the incoming work items, wherein: the priorities of the incoming work items are based on a type of work item and a customer associated with the incoming work item; and the priorities of the incoming work items are relative to each other; analyzing the collected profile of the agents and the monitored current status of the agents and the priorities of the incoming work items;

generating, dynamically, multiplicity configurations for the agents based on the analyzed data, wherein the multiplicity configuration indicates how many work items may be handled by the agent associated with the multiplicity configuration; and assigning a plurality of media channels to communication devices associated with the agents based on the generated multiplicity configurations, wherein the assignment of the media channels enables the multichannel routing administration.

13. The computer-implemented method of claim 12, wherein the profile of an agent comprises one or more of a self-description, skill sets, likes, locations, interests, education and work histories, hometowns, and cultural background.

14. The computer-implemented method of claim 12, wherein the parameters of the work items comprises one or more of a type of the incoming work items, and a context of the incoming work items.

15. The computer-implemented method of claim 13, wherein the type of the incoming work items comprises one or more of a video call, a voice conversation, an email, a web chat, and an instant messaging.

16. The computer-implemented method of claim 12, wherein the current status of agents comprising number of existing work items being handled by the agents, the type of work items handled by the agents, and priority of the customers.

17. The computer-implemented method of claim 12, further comprising enabling the agents to downcast, based on a priority of the existing work item, wherein the priority of the existing work item is based on a type of work item and a customer associated with the existing work item, an existing work item to one or more of:

an automated chat agent, and a communication device associated with another agent.

18. The computer-implemented method of claim 12, further comprising enabling the agents to handle the incoming work items on different media channels, wherein the media channels comprises one or more of a video channel, a telephone channel, an email account, a web chat session, and an instant messaging session.

19. The computer-implemented method of claim 12, further comprising enabling the agents to communicate with a customer on two different media channels based on predefined rules.

20. A computer-implemented method for multichannel routing administration, the method comprising:

collecting a profile of an agent and parameters of an incoming work item; monitoring current status of the agents and priorities of the incoming work items, wherein: the priorities of the incoming work items are based on a type of work item and a customer associated with the incoming work item; and the priorities of the incoming work items are relative to each other;

analyzing the collected profile of the agent and the monitored current status of the agent and the priorities of the incoming work item;

generating, dynamically, multiplicity configurations for the agents based on the analyzed data, wherein the multiplicity configuration indicates how many work items may be handled by the agent associated with the multiplicity configuration;

matching the parameters of the work item with the generated multiplicity configuration of the agent; and assigning a plurality of media channels to communication devices associated with the agents based on the generated multiplicity configurations, wherein the assignment of the media channels enables the multichannel routing administration.

* * * * *